United States Patent [19]

Schreiner et al.

[11] Patent Number: 4,689,003
[45] Date of Patent: Aug. 25, 1987

[54] APPARATUS FOR THE CONTINUOUS PRODUCTION OF ELONGATE HOLLOW BODIES

[75] Inventors: Wilhelm Schreiner; Wolfgang Grimm, both of Leverkusen, Fed. Rep. of Germany

[73] Assignee: Bayer Aktiengesellschaft, Leverkusen, Fed. Rep. of Germany

[21] Appl. No.: 741,517

[22] Filed: Jun. 5, 1985

[30] Foreign Application Priority Data

Jun. 8, 1984 [DE] Fed. Rep. of Germany ....... 3421364

[51] Int. Cl.$^4$ ............................................. B29D 23/22
[52] U.S. Cl. ........................... 425/224; 118/DIG. 10; 118/DIG. 11; 156/173; 156/244.13; 156/429; 264/209.2
[58] Field of Search ..................... 425/224; 264/209.1, 264/166, 209.2; 156/244.13, 246, 242, 172, 173, 175, 428, 429, 425, 501, 324, 289; 118/DIG. 10, DIG. 11; 427/231, 235

[56] References Cited

U.S. PATENT DOCUMENTS

| 1,309,424 | 7/1919 | Seiberling | 156/429 |
| 1,669,555 | 5/1928 | Finley | 156/429 X |
| 1,914,455 | 6/1933 | Pahl | 156/173 X |
| 1,961,833 | 6/1934 | Staples | 156/429 X |
| 2,502,638 | 4/1950 | Becht | 156/244.13 X |
| 3,796,620 | 3/1974 | Dunn | 156/429 X |
| 3,843,435 | 10/1974 | Strom | 264/209.1 X |
| 3,886,338 | 5/1975 | Lokun et al. | 156/429 X |
| 4,213,811 | 7/1980 | Hall et al. | 156/429 X |
| 4,361,459 | 11/1982 | Martin | 156/429 X |

Primary Examiner—Richard L. Chiesa
Attorney, Agent, or Firm—Gene Harsh; Joseph C. Gil; Aron Preis

[57] ABSTRACT

The present invention is directed to an apparatus for the continuous production of elongate hollow bodies or inner linings for such hollow bodies, from a liquid material wherein the peripheral surface of a mandrel rotating about a horizontal or slightly inclined shaft is covered with a separating film and the liquid material is applied to said separating film and the resulting hollow body is continuously from the mandrel in the axial direction of the shaft while observing the solidification speed of the material, the improvement wherein the separating film is applied to the mandrel in the axial direction of the shaft.

6 Claims, 2 Drawing Figures

APPARATUS FOR THE CONTINUOUS PRODUCTION OF ELONGATE HOLLOW BODIES

BACKGROUND OF THE INVENTION

The present invention relates to a process and to an apparatus for the production of elongate hollow bodies, more particularly tubes, pipes, or inner linings for such hollow bodies, from a liquid material, such as reaction mixture or melt, wherein the peripheral surface of a support rotating about a horizontal or slightly inclined shaft is covered with a separating film and the material is applied to this separating film. The resulting hollow body is continuously drawn in the axial direction of the shaft while observing the solidification speed of the material.

A separating film has been used in the production of such hollow bodies, which is wound onto a mandrel in the direction of the circumference thereof. The liquid material is subsequently applied to this layer. After the hollow body has drawn from the mandrel, the separating film is then removed. The disadvantage of this method is that the spirally-wound separating film forms ridges on the inside wall of the resultant hollow body. Depending on the winding angle of the separating film and the height of the resulting ridges, there is produced a relatively large resistance to flow and a twisting effect on the flow on the inside wall of the tube. The ridges wear down in time. Hollows, due to cavitation, are produced behind the ridges which also cause flow resistance. The pipe prematurely wears because of this.

An object of the present invention is to reduce the interior pipe resistance and wear by a suitable process, and to provide a suitable apparatus for the production of such hollow bodies.

DESCRIPTION OF THE INVENTION

Figure 1:
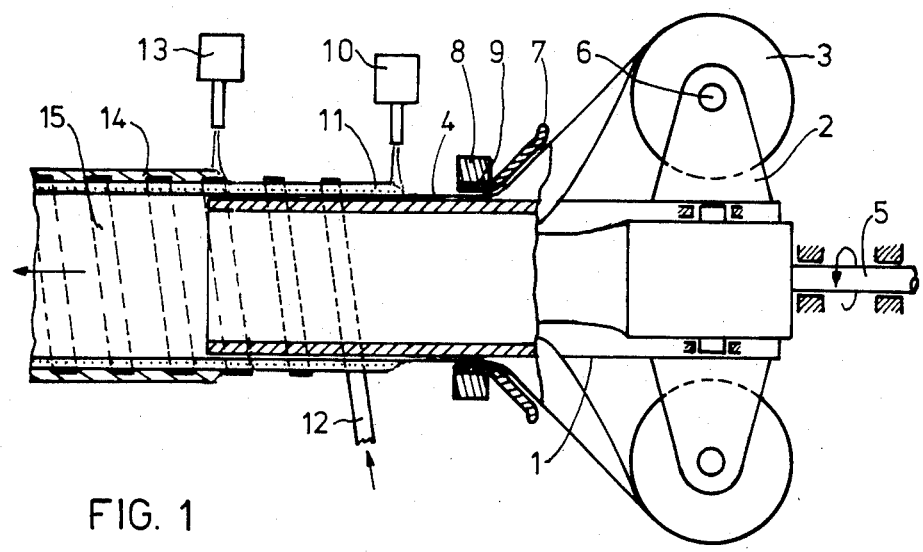
FIG. 1 shows a first embodiment of the present process whereby separating films are drawn from roller brackets.

The above-noted object is achieved by applying the separating film to the rotating base in the axial direction of the shaft. This ensures that the ridge produced on the inside wall of the hollow body is only formed in the longitudinal direction of the hollow body. The pipe resistance is thereby reduced to the normal amount and there are no signs of cavitation. This also means that in the area of the ridge, the wear of the inside wall of the hollow body is reduced to the normal amount.

If hollow bodies having a relatively large diameter are to be produced, a separating film of several overlapping or joined widths is preferably used. This has the advantage that the individual widths may be more easily placed on the peripheral surface of the base.

The separating film consists in known manner of a silicone paper, polytetrafluoroethylene film, polyethylene film or the like.

The new apparatus for the continuous production of elongate hollow bodies (more particularly of tubes, pipes, or inner linings for such hollow bodies), of a liquid material such as reaction mixture or melt, is based on a rotating mandrel to which at least one material supply device and at least one roller bracket for a roller for supplying a separating film is associated.

The novel characteristics are that the roller bracket is arranged in a rotating manner with the mandrel. The shaft of the supply roller is oriented transversely to the shaft of the mandrel. In this manner, separating films may be applied to the mandrel parallel to the shaft thereof. If the separating films do not have a transverse tension causing a rolling effect which causes them to be placed on the mandrel, guide elements approximating the shape of the mandrel are provided for the separating film.

Sliding parts having a cellular polyurethane coating are preferably associated with the guide elements. Coatings of this type are particularly resistant to wear, have good sliding properties and mold the separating film particularly well to the mandrel.

According to an alternative embodiment of the novel apparatus, the separating film consists of several continuous widths which are guided along the outer surface of the mandrel in the operating direction and are guided back via deflecting elements through the cavity of the mandrel, openings in the mandrel being provided to this end.

In the first embodiment of the present apparatus the separating film has to be removed from the hollow body after it has been cut into lengths. The second embodiment is advantageous in that the endless widths remove themselves from the resulting hollow body during the operation. Furthermore, this second method operates without losses, in that the separating film is re-usable and is only subjected to normal wear. The endless widths have little adhesion and consist, for example, of silicone, tetrafluoroethylene or of an optionally reinforced carrier which is coated with one of these materials. It is also possible that the endless widths are driven by the drawing force with which the hollow body is drawn from the mandrel. However, drive devices are preferably associated with the endless widths so that the forward feed thereof is ensured. The drive mechanism preferably consists of a planet wheel drive mechanism.

The new process and apparatus may be designed such that, during production of the hollow body, reinforcing inserts may be inserted therein in known manner. Several material supply devices may be provided in tandem. The hollow body may be covered with an outer lining in the last phase of the process. Thus, the entire process may be preferably carried out in successive stages on the same apparatus.

Thermoplastics, more particularly thermoplastic polyurethane elastomers are suitable as the material for the elongate hollow bodies. Materials which have a solidification time of from 0.5 to about 180 seconds are generally preferred. Reactive starting components which form polyurethane, polyester resin or epoxide resin are also suitable.

The new apparatus is diagrammatically shown in two embodiments in the accompanying drawings and is explained in more detail in the following.

In FIG. 1, the apparatus consists of rotationally driven mandrel 1 which is supported at one end. Four roller brackets 2 are attached thereto, from which overlapping widths of a separating film 4 run from supply rollers 3. The roller brackets 2 are fixed with the mandrel 1 to the driven shaft 5. The shafts 6 thereof are transverse to the shaft 5 of the mandrel 1. Guide elements 7 approximating the shape of the mandrel 1 cause the separating film 4 to assume the shape of the mandrel.

They are provided with sliding parts 8 having a cellular polyurethane elastomer coating 9. A first material supply device 10 is located behind this. A liquid polyurethane elastomer is applied by the supply device 10, which forms an inner lining 11 on the separating film 4. A fabric strip 12 for reinforcement is wound on at a further station. A second layer 14 of thermoplastic polyurethane elastomer is applied by a second material supply device 13. The mandrel 1 rotates relatively slowly and the resulting hollow body 15 is drawn off by conventional means while observing the solidification speed.

Figure 2:
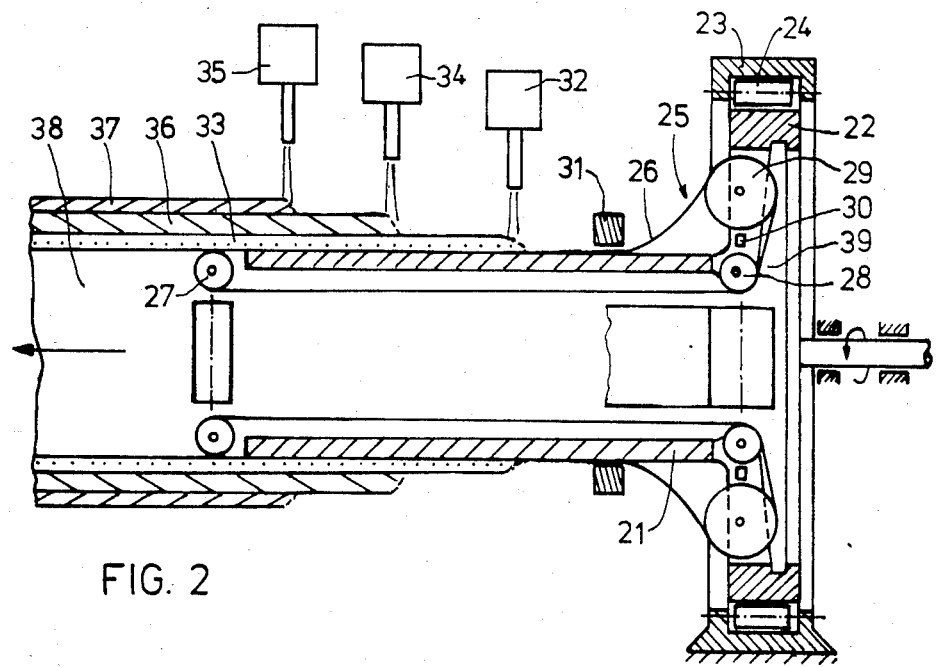
FIG. 2 shows a second embodiment of the present process having endless widths as separating films.

The apparatus in FIG. 2 also consists of a rotationally-driven mandrel 21 which is supported at one end. It is provided with a spoked wheel 22 which is supported in a stationery rim 23 on rollers 24. Endless bands 26 are associated with the mandrel 21 as a separating film 25. They run via guide elements 27 and 28 and via rollers 29 which are driven by a planet wheel drive mechanism 30. The endless bands 26 are positioned on the contour of the mandrel 21 by guide elements 31 and contact each other. The bands 26 consist of plastic material having fabric inserts and are coated with silicone. A first layer 33 of liquid material is applied using a material guide device 32; a second and third layer 36 or 37 are applied by material supply devices 34 and 35. The hardened hollow body is indicated by reference numeral 38. The openings for the passage of the bands 26 is designated by reference numeral 39.

The invention is further illustrated, but is not intended to be limited by the following examples in which all parts and percentages are by weight unless otherwise specified.

EXAMPLES

Example 1

The apparatus according to FIG. 1 is used. The mandrel 1 rotates at 36 rpm. It has a diameter of 10.5 cm and a circumference of 33 cm. Four overlapping widths of polyethylene paper with a thickness of 250 m are allowed to enter as a separating film 4. A mixture of 100 parts by weight of polyether diamine mixture, i.e. BAYTEC® VP PU 0308 (a product and trademark of BAYER AG, D-5090 Leverkusen-Bayerwerk, Federal Republic of Germany), and 80 parts by weight of the MDI-polyether prepolymer BAYTEC® VP PU 0309 (of BAYER AG) are applied in a quantity of 1.081 kg/min by material supply device 10. This forms an inner lining 11 having a thickness of 6 mm. The solidification time of the mixture which is applied from a circular nozzle with an opening width of 6 mm is 17 secs. This produces the requisite minimum length of the hardening stage in the shaft direction of the mandrel 1, which is 14 cm. The drawing speed of the finished pipe 15 is 0.47 m/min. A strip of fabric 12 of glass fibers for reinforcement is wound on behind the material supply device 10. Its width corresponds to the width of the mixture which is applied with the material supply device 10, but is staggered with respect to it by half a width. A further mixture having the following composition is applied in a quantity of 0.786 kg/min by the second material supply device 13 and after the solidification time of 15 seconds forms a layer 14 having a thickness of 4 mm: 100 parts by weight of the aforementioned polyether diamine mixture and 104 parts by weight of the afore-mentioned MDI-polyether prepolymer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the continuous production of elongate hollow bodies or inner linings for such hollow bodies, from a liquid material, comprising a rotating mandrel to which a material supply device and at least one roller bracket for a supply roller of a separating film are associated, characterized in that the roller bracket is attached to and rotates with the mandrel and the shaft of the supply roller is oriented transversely to the shaft of the mandrel, so that the separating film is guided to and along in a single direction parallel to the axis of the mandrel.

2. An apparatus for the continuous production of elongate hollow bodies or inner linings for such hollow bodies, from a liquid material, comprising a rotating mandrel and a separating film characterized in that the separating film consists of several endless widths which are guided to and along the outer surface of the mandrel in a single direction parallel to the axis of the mandrel and are guided back via guide elements through the cavity of the mandrel.

3. An apparatus according to claim 2, characterized in that a drive mechanism is assigned to the endless widths.

4. An apparatus according to claim 3, characterized in that the drive mechanism comprises a planet wheel drive mechanism.

5. An apparatus according to either claim 1 or claim 4, characterized in that guide elements approximating the shape of the mandrel are provided for the separating film.

6. An apparatus according to claim 5, characterized in that sliding parts having a cellular elastomer coating are attached to the guide elements.

* * * * *